United States Patent
Sharma

(10) Patent No.: US 12,477,343 B2
(45) Date of Patent: Nov. 18, 2025

(54) MOBILE VIRTUAL NETWORK OPERATOR NETWORK ACCESS CONTROL

(71) Applicant: Cox Communications, Inc., Atlanta, GA (US)

(72) Inventor: Tushar Sharma, Chantilly, VA (US)

(73) Assignee: Cox Communications, Inc.

( * ) Notice: Subject to any disclaimer, the term of this patent is extended or adjusted under 35 U.S.C. 154(b) by 227 days.

(21) Appl. No.: 18/067,454

(22) Filed: Dec. 16, 2022

(65) Prior Publication Data

US 2024/0205686 A1 Jun. 20, 2024

(51) Int. Cl.
| | |
|---|---|
| *H04W 12/72* | (2021.01) |
| *H04L 9/14* | (2006.01) |
| *H04W 12/037* | (2021.01) |
| *H04W 12/06* | (2021.01) |
| *H04W 12/04* | (2021.01) |
| *H04W 12/08* | (2021.01) |

(52) U.S. Cl.
CPC ............ *H04W 12/72* (2021.01); *H04L 9/14* (2013.01); *H04W 12/037* (2021.01); *H04W 12/06* (2013.01); *H04W 12/04* (2013.01); *H04W 12/08* (2013.01)

(58) Field of Classification Search
CPC ... H04W 12/72; H04W 12/037; H04W 12/06; H04W 12/04; H04W 12/08; H04L 9/14
See application file for complete search history.

(56) References Cited

U.S. PATENT DOCUMENTS

| | | | |
|---|---|---|---|
| 2014/0098671 A1 | 4/2014 | Raleigh et al. | |
| 2017/0270509 A1* | 9/2017 | Colegate | H04L 63/061 |
| 2019/0149521 A1* | 5/2019 | Jerichow | H04L 9/3226 |
| | | | 713/171 |
| 2022/0232366 A1 | 7/2022 | Seo | |
| 2023/0097792 A1* | 3/2023 | Wong | H04W 76/12 |
| | | | 370/329 |

OTHER PUBLICATIONS

International Search Report and Written Opinion of PCT/US2023/084365 mailed Apr. 15, 2024, 13 pages.

* cited by examiner

*Primary Examiner* — Cheng-Feng Huang
(74) *Attorney, Agent, or Firm* — Merchant & Gould P.C.

(57) ABSTRACT

An MVNO utilizes MNVO-controlled equipment to control generation of public-private key pairs, provisioning of user devices using a public-private key pair, and authenticating user devices requesting access to an MVNO network using the public-private key pair. An MNVO-controlled provisioning server can use a key of a public-private key pair to encrypt a SIM-based identity that is associated with a user device. When the user device requests access to an MVNO network, an MNVO-controlled authentication server requests an encrypted SIM-based identity from the user device and uses a key to decrypt the SIM-based identity as part of determining whether to grant MVNO network access to the user device. Encrypted SIM-based identities enable an MVNO to rely on MVNO-controlled equipment when authenticating user devices to access MVNO network without the additional message overhead accumulated when an MNO mobile core is required to determine whether to grant access to user devices.

20 Claims, 9 Drawing Sheets

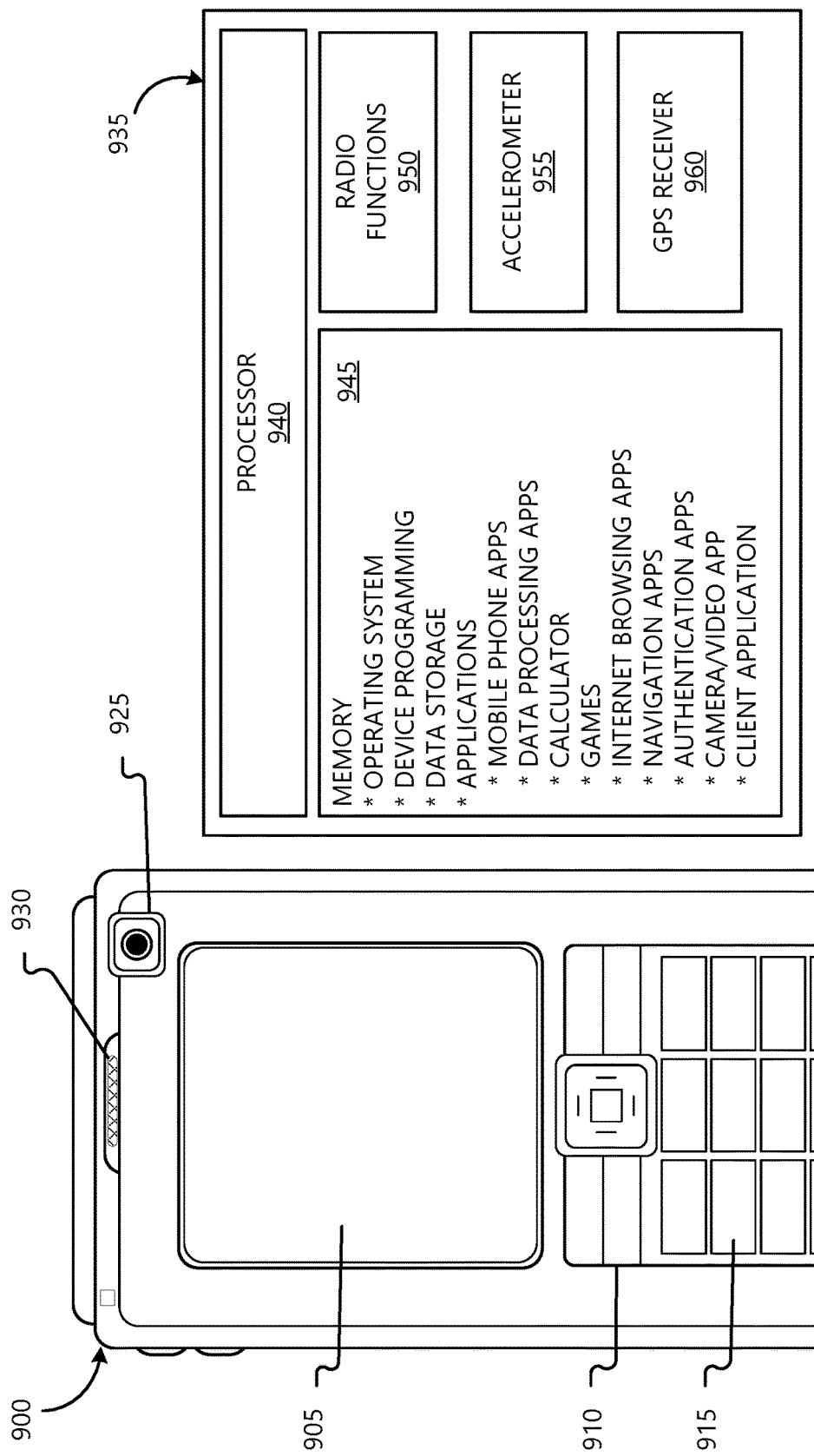

MOBILE VIRTUAL NETWORK OPERATOR NETWORK ACCESS CONTROL

BACKGROUND

Today's modern communication infrastructure enables users the flexibility of being mobile while using end-user devices to transact personal and business tasks. Handheld end-user devices, such as smartphones and tablets for example, can be equipped with multiple wireless interface types, such as cellular network interfaces (4G, 5G, etc.) and wireless networking interfaces developed according to the Institute of Electrical and Electronics Engineers (IEEE) standards, such as IEEE 802.11 type (e.g., WIFI), IEEE 802.15 type (e.g., BLUETOOTH), etc. Different types of networking equipment are readily available from multiple vendors to set up home and business networks for use with handheld end-user devices. Some of the end-user devices can be configured through device settings to select a primary network preference (e.g., WIFI) and a backup network preference (e.g., cellular radio).

The convenience attributed to the modern communication infrastructure and various communication protocols are not without limitations. For instance, live calls and remote videoconferencing require strict handoff tolerances so that packets are not dropped or corrupted when moving between different locations and/or types of networks. As an example, when transitioning from a first network type (e.g., IEEE 802.11 network) to a second network type (e.g., cellular network), the amount of time that it takes for a user device to access and connect to the second network is critical to handing over the communication session. If it takes too long to access and connect to the second network, the handover suffers and packets can be lost or corrupted which adversely impacts the communication session.

Access to cellular networks are typically provided to subscribers by a mobile operator network (MNO) or a mobile virtual network operator (MVNO) network. One technical problem facing an MVNO is not having control over authentication mechanisms required by an MNO since the equipment and/or infrastructure is controlled by the MNO. For example, in order to authenticate that a user is authorized to access an MVNO network, the MVNO may be required to send authentication request messages to an MNO mobile core, which has an authentication server and associated Home Subscriber Server (HSS) or Unified Data Manager (UDM)/Unified Data Repository (UDR). The additional messages sent to the MNO, including the amount of time required to send and receive authentication request/response data, adds additional overhead to the authentication process and contributes to an amount of latency associated with a communication session. Moreover, sensitive information may be compromised since the MVNO has little control over what an MNO does with the authentication data. A technical solution is needed to reduce the amount of time required to access and connect to a preferred wireless communication network. A technical solution is also needed to reduce the amount of time required to transition from one network type to a different network type which may result in improved handover with fewer dropped or corrupt packets during a communication session.

SUMMARY

According to aspects disclosed herein, an MVNO utilizes MNVO-controlled equipment to authenticate user devices requesting access to the MVNO network, but are not so limited. According to an aspect, an MVNO utilizes MNVO-controlled equipment to control generation of public-private key pairs, provisioning of user devices using a public-private key pair, and authenticating user devices requesting access to the MVNO network using the public-private key pair. According to an aspect, an MNVO-controlled provisioning server can be configured to use a key of a public-private key pair to encrypt a subscriber identity module (SIM)-based identity that is associated with a user device. When the user device requests access to the MVNO network, the MNVO-controlled authentication server can be configured to request an encrypted SIM-based identity from the user device and use a key of the public-private key pair to decrypt the encrypted SIM-based identity as part of determining whether to grant MVNO network access to the user device. Encrypted SIM-based identities enable an MVNO to rely on MVNO-controlled equipment when authenticating user devices to access the MVNO network without the additional message overhead accumulated when an MNO mobile core is required to determine whether to grant access to user devices.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 9A-9B illustrate a suitable mobile computing device with which aspects can be practiced.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
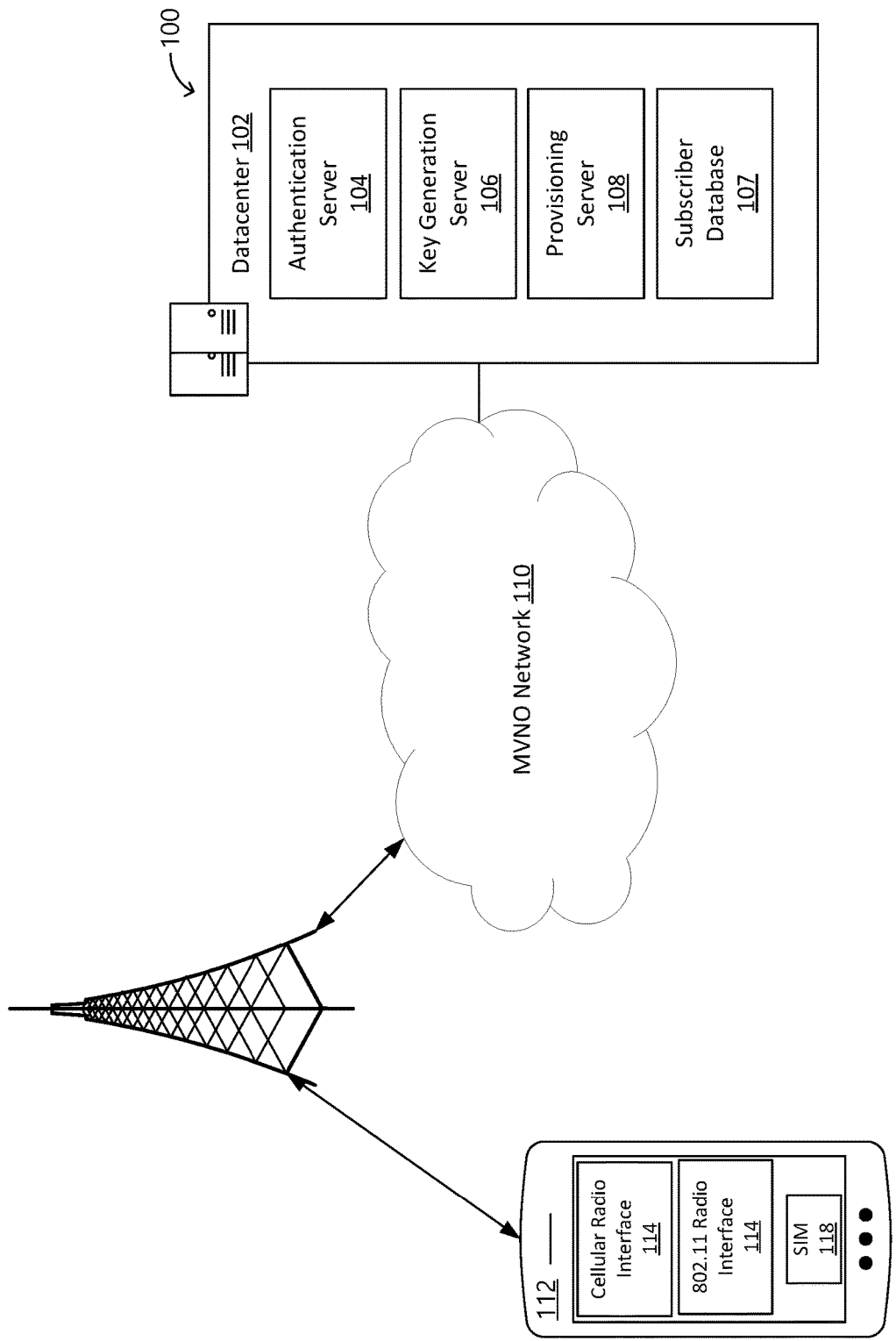
FIG. 1 is a block diagram of an exemplary communication environment for authenticating user devices, according to an aspect.

FIG. 1 is a block diagram of an exemplary communication environment 100 for authenticating user devices when attempting to access mobile virtual network operator (MVNO) network 110, but is not so limited. According to an aspect, datacenter 102 of MVNO includes an authentication server 104, a key generation server 106, a provisioning server 108, and a subscriber database 107. While a single datacenter 102 is depicted, MVNO can include multiple datacenters at different physical locations. Each of the authentication server 104, key generation server 106, provisioning server 108, and/or subscriber database 107 can be implemented using a corresponding physical server machine. According to one aspect, a first physical server machine includes authentication server 104 and subscriber database 107, a second physical server machine includes key generation server 106, and a third physical server machine includes provisioning server 108. Each server machine includes at least one processor and memory (see example of FIG. 8), wherein the memory stores instructions which, when executed by at least one processor, provide functions of each of the authentication server 104, key generation server 106, and provisioning server 108. Additionally, each server machine can be configured with additional functionality or components and the various aspects described herein are not intended to be limited by this description.

As described below in conjunction with FIGS. 3 and 5, key generation server 106 can be configured to generate a public-private key pair for use in provisioning devices for MVNO network 110 and/or for authenticating devices wishing to access MVNO network 110. For example, provisioning server 108 can use the public key of a public-private key pair to encrypt subscriber identity module (SIM)-based identities that are associated with user devices 112 as part of onboarding new subscribers. After receiving a request to access MVNO network 110 from a user device 112, authentication server 104 can use the private key of the public-private key pair to decrypt a SIM-based identity as part of determining whether to allow access to MVNO network 110. As described further below, authentication server 104 can refer to subscriber database 107 as part of determining whether to allow user device 112 to access MVNO network 110.

As shown in the example of FIG. 1, user device 112 (see for example FIGS. 9A and 9B) includes at least two wireless interfaces, a cellular radio interface 114 (e.g., LTE, 4G, 5G, etc.) and an Institute of Electrical and Electronics Engineers (IEEE) 802.11 radio interface 116 (e.g., WIFI). As described below, depending on signal quality performance, and/or other communication issues, user device 112 can be configured to switch from one wireless interface to another. For example, if user device 112 is currently operating as a WIFI-client and the WIFI signal becomes unusable, user device 112 can be configured to automatically switch over to cellular radio interface 114 to access MVNO network 110. User device 112 includes at least one SIM 118 such as a removable SIM card and/or an embedded SIM (eSIM).

As described below, an MVNO is able to use authentication server 104 to control access to MVNO network 110 without using Mobile Device Management (MDM) or having to contact a Home Subscriber Server (HSS) or Unified Data Manager (UDM)/Unified Data Repository (UDR) of a mobile network operator (MNO) (i.e., the MNO mobile core). As a technical result, an MVNO is able to reduce communication latency within communication environment 100 as well as reducing the amount of time it takes to access MVNO network 110 resulting in improved handovers. An MVNO is also able to securely control access to MVNO network 110 by bypassing an HSS or UDM/UDR of an MNO. Correspondingly, an MVNO is able to control which user devices 112 access MVNO network 110 as well as protecting sensitive data by preventing unauthorized access to user data by MNO authentication equipment. Moreover, the number of communication hops is reduced by bypassing MNO authentication equipment which may result in reduced latency and improved communication sessions.

Figure 2:
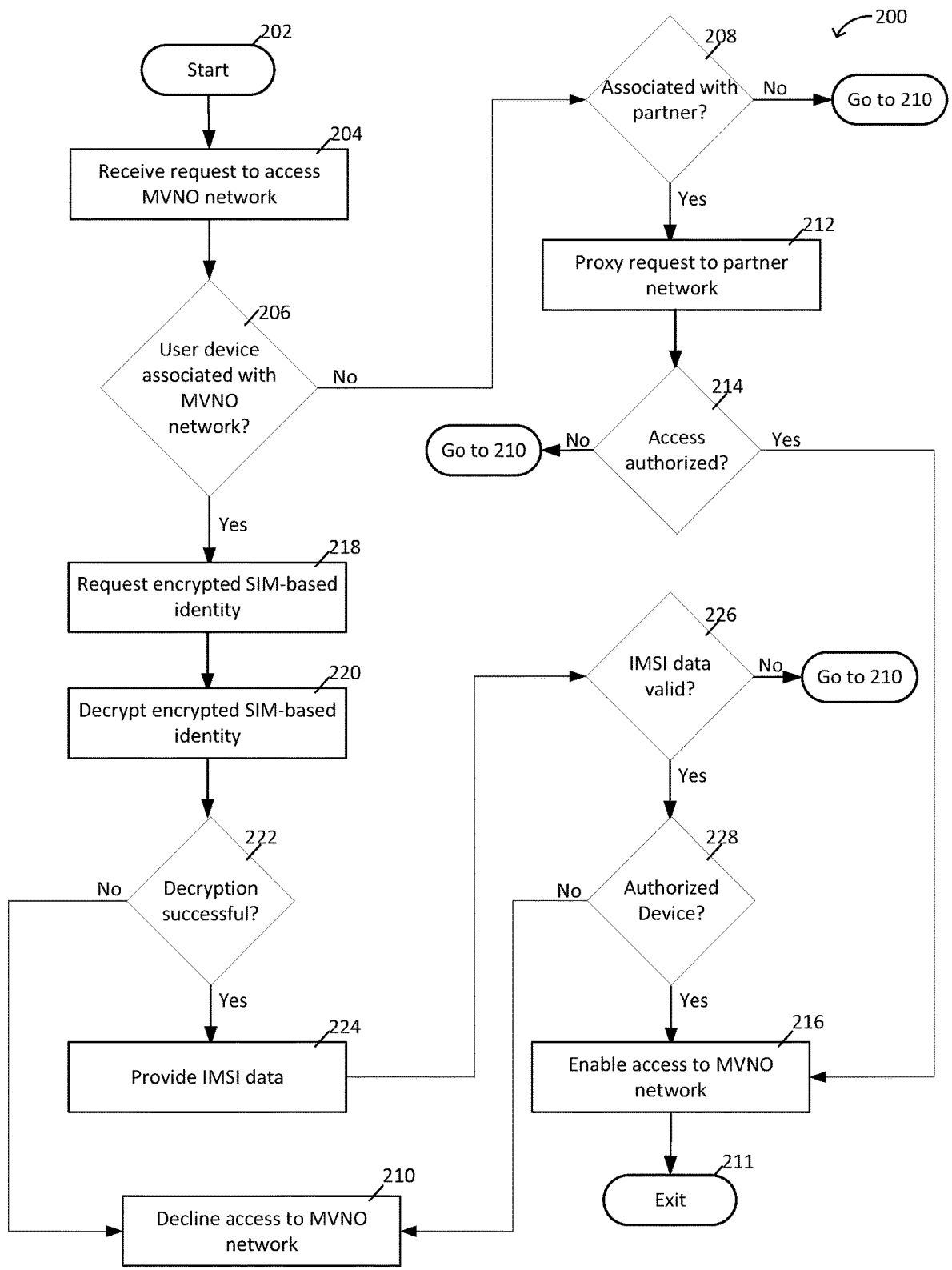
FIG. 2 is a flow diagram of an exemplary method of using an authentication server to control access to an MVNO network, according to an aspect.

FIG. 2 is a flow diagram of an exemplary method 200 of using authentication server 104 to control access to MVNO network 110, according to an aspect. Method 200 is configured to enable access to MVNO network 110 without using MDM or having to contact an HSS or UDM/UDR of an MNO. Accordingly, method 200 is able to reduce communication latency as well as reducing the amount of time to enable access to MVNO network 110 which may result in fewer dropped or corrupted packets. Method 200 begins at 202 and proceeds to 204 where authentication server 104 receives, from a user device 112, a network access request to access the MVNO network 110. According to an aspect, authentication server 104 can be configured as a standalone server machine located in datacenter 102, wherein the standalone server machine includes at least one processor and memory where method 200 comprises a set of executable instructions stored in memory.

If user device 112 is not associated with MVNO network 110 at 206, method 200 proceeds to 208 and determines if user device 112 is associated with a partner network. According to one aspect, method 200 uses authentication server 104 to extract an outer identity, such as a Mobile Country Code (MCC) and a Mobile Network Code (MNC) for example, from the user request as part of determining whether user device 112 is associated with MVNO network 110 or a partner network. For example, a determination can be made by authentication server 104 if the MCC has a particular value and MNC has a particular value (e.g., MCC=310 and MNC=480) when determining whether user device 112 is associated with MVNO network 110 or a partner network. As an example, an outer identity typically does not provide any device-specific information. For example, if IMSI privacy protection is enabled, a device will initially respond with anonymous@<NAI Realm>. The NAI realm format for an outer identity is wlan.mncXXX.mccYYY, where XXX is replaced with the SIM mobile network code (MNC) and YYY is replaced with the mobile country code (MCC). An inner identity provides device identification information and is typically encrypted to avoid privacy issues and trackability.

If user device 112 is not associated with a partner network at 208, method 200 proceeds to 210 and declines access to MVNO network 110 before exiting at 211. If user device 112 is associated with a partner network at 208, at 212 method 200 proxies the access request to the partner network. If the partner network authenticates user device 112 at 214, method 200 enables access to MVNO network 110 at 216. If the partner network does not authenticate user device 112 at 214, method 200 declines access to MVNO network 110 at 210 before exiting at 211.

If user device 112 is associated with MVNO network 110 at 206, method 200 proceeds to 218 and requests an encrypted SIM-based identity from user device 112. According to one aspect, the SIM-based identity is associated with at least one SIM of the user device, such as one or more removable SIM cards and/or eSIMs. As described further below, a provisioning service of provisioning sever 108 can be configured to use a public-private key pair (e.g., a public key) to generate an encrypted SIM-based identity that includes an encrypted concatenation of the MCC, MNC, and a mobile telephone number or other identifier of user device 112. The encrypted SIM-based identity can be provided to user device 112 as part of a subscription onboarding process and stored in secure storage of user device 112, such as an impenetrable or tamper-proof hardware storage (e.g., secure enclave).

After receiving the encrypted SIM-based identity, at 220, method 200 uses authentication server 104 to decrypt the encrypted SIM-based identity using the public-private key pair (e.g., a private key). If the decryption operation is unsuccessful at 222, method 200 declines access to MVNO network 110 at 210 before exiting at 211. If the decryption operation is successful at 222, method 200 proceeds to 224 and provides International Mobile Subscriber Identity (IMSI) data that is associated with the SIM-based identity. For example, at 224 method 200 provides an MCC, an MNC, and a 0-9 digit number resulting from the decryption operation.

If the IMSI data is invalid at 226, method 200 declines access to MVNO network 110 at 210 before exiting at 211. For example, method 200 can use authentication server 104 to lookup valid numbers and formats for the MCC, MNC and mobile telephone number as part of the validation operation. If the IMSI data is valid at 226, method 200 proceeds to 228 to determine whether user device 112 is authorized to access MVNO network 110. According to an aspect, at 228, method 200 uses subscriber database 107 to determine whether user device 112 is authorized to access MVNO network 110.

For example, authentication server 104 can perform a lookup operation in subscriber database 107 to determine whether the decrypted IMSI data matches IMSI data that was provided at the time of provisioning services for the subscriber. If method 200 determines that user device 112 is unauthorized to access MVNO network 110 at 228, method 200 declines access to MVNO network 110 at 210 before exiting at 211. If method 200 determines that user device 112 is authorized to access MVNO network 110 at 228, method 200 grants access to MVNO network at 216 before exiting at 211.

Figure 3:
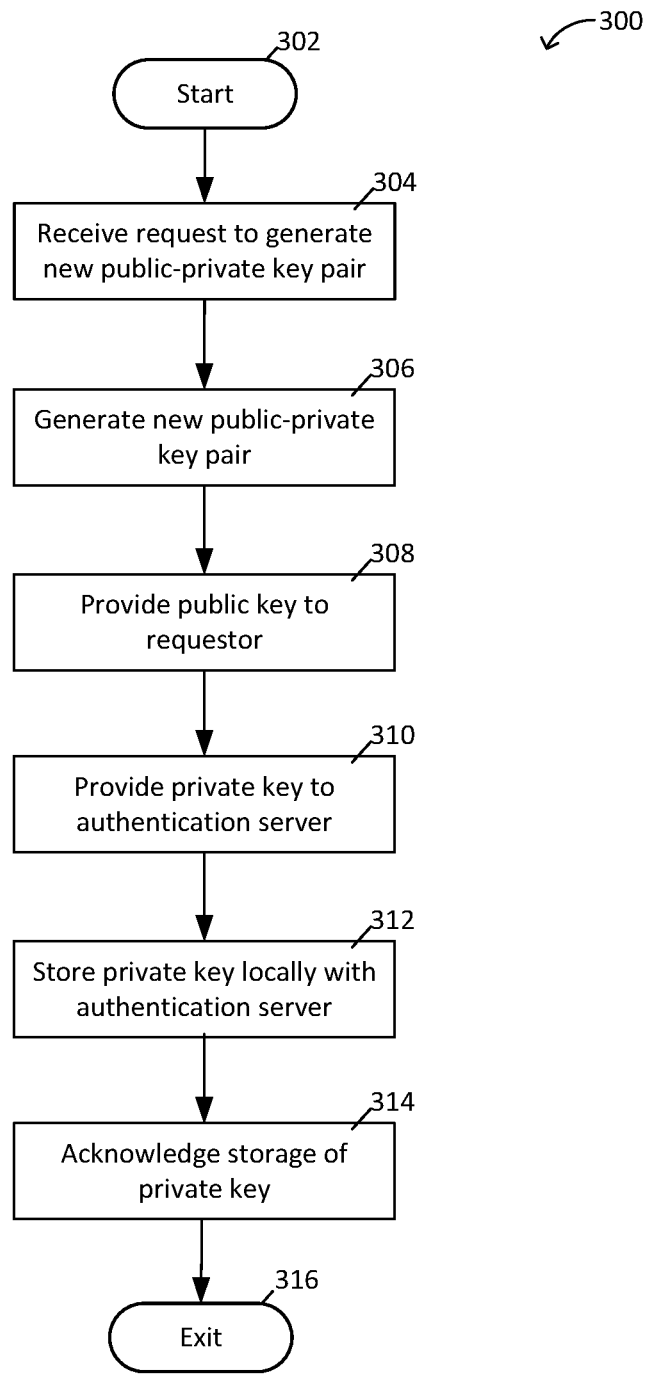
FIG. 3 is a flow diagram of an exemplary method of generating a public-private key pair, according to an aspect.

FIG. 3 is a flow diagram of an exemplary method 300 of generating a public-private key pair, according to an aspect. The generated public-private key pair can be used as part of provisioning user devices as part of onboarding new subscribers to MVNO network 110 as well as authenticating user devices that request access to MVNO network 110. Method 300 can be configured to generate a public-private key pair automatically or on-demand. For example, an automated process can be used to automatically generate a new public-private key pair upon detection that a currently implemented private key of a public-private key pair has been compromised or is otherwise required to be renewed (e.g., a time to expire or time to live has passed). As another example, an authorized user can send a request from a user device or workstation to key generation server 106 requesting that a public-private key pair be generated.

With continuing reference to FIG. 3, method 300 begins at 302 and proceeds to 304 receiving a request to generate a public-private key pair. As described above, the request may be automated or submitted by an authorized user. At 306, method 300 uses key generation server 106 to generate a new public-private key pair. For example, key generation server 106 can be configured to generate a 2048-bit private-public key pair which can be stored on key generation server 106. A time to live value can be associated with the public-private key pair so that new public-private key pairs are generated according to a temporal preference.

At 308 method 300 uses key generation server 106 to provide the public key of the new public-private key pair to the key generation requestor. For example, key generation server 106 can provide a public key of the new public-private key pair to provisioning server 108 to use for encrypting SIM-based identities for user devices of subscribing users and/or store the public key locally with key generation server 106. In some cases, method 300 also stores the public key locally in computer storage associated with the key generation requestor as well as acknowledging local storage operations.

At 310, method 300 provides the private key of the new public-private key pair to authentication server 104 for use when authenticating user devices requesting access to MVNO network 110. For example, key generation server 106 can provide a private key of the new public-private key pair to authentication server 104 to decrypt SIM-based identities of user devices requesting access to MVNO network 110. At 312, method 300 stores the private key locally with authentication server 104. For example, method 300 can be configured to encrypt and store the private key in an escrow store, such as a secure hardware storage location of authentication server 104. At 314, method 300 uses authentication server 104 to send a message to key generation server 106 acknowledging that the private key has been stored before exiting at 316.

Figure 4:
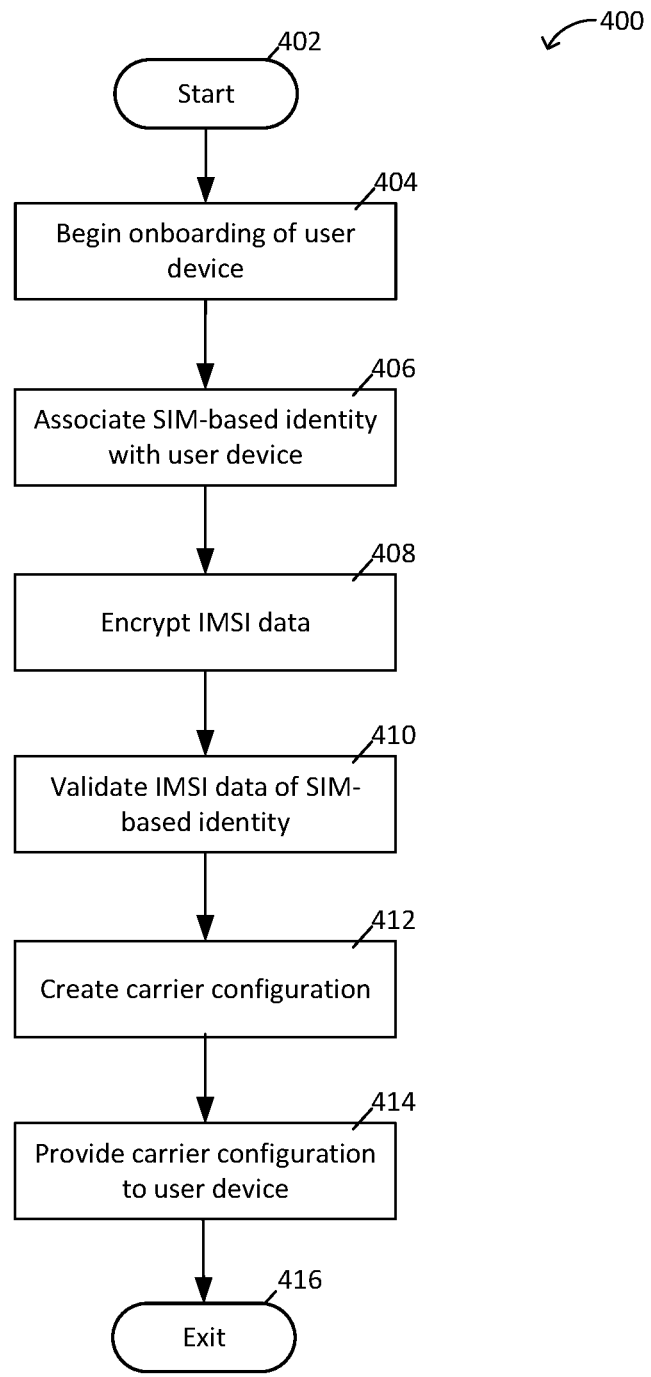
FIG. 4 is a flow diagram of an exemplary method of provisioning service to a user device in order to access an MVNO network, according to an aspect.

FIG. 4 is a flow diagram of an exemplary method 400 of provisioning service to a user device 112 in order to access MVNO network 110, according to an aspect. For example, method 400 can be used when a user would like to utilize user device 112 with MVNO network 110. As described below, method 400 associates a SIM-based identity with each user device as part of subscribing to access MVNO network 110. Method 400 can be configured to provision services so that different types of user devices are able to access MVNO network 110 based in part on encrypted SIM-based identities which are carried by subscribing devices. The encrypted SIM-based identities enable an MVNO to rely on MVNO-controlled authentication equipment when authenticating user devices in order to access MVNO network 110 without requiring authentication by an MNO mobile core.

Method 400 starts at 402 and proceeds to 404 to begin onboarding user device 112 as part of allowing user device 112 to access MVNO network 110. For example, users can purchase new devices or onboard previously purchased devices that are equipped to operate with the specifications of MVNO network 110 (e.g., 4G, 5G, etc.). There are a variety of ways to kickoff onboarding of user devices that will be allowed to access MVNO network 110. For example, users can go to a retail store offering MVNO network service or sign-up over the Internet or other network from a home or business location.

At 406, method 400 uses provisioning server 108 to associate a SIM-based identity with user device 112. For example, a QR-code can be scanned to contact provisioning server 108 to provision services for user device 112 according to a SIM-based identity, such as an IMSI for example. The user device 112 or some other device can be used to scan the QR code to launch the onboarding process and/or associate a unique IMSI (e.g., a number of digits that includes an MCC, an MNC, and a Mobile Subscriber Identification Number (MSIN)) with MVNO network 110. The IMSI is included with a removable SIM card or an eSIM of user device 112.

At 408, method 400 uses provisioning server 108 to encrypt the SIM-based identity using a public-private key pair (e.g., encrypt with the public key) generated by key generation server 106. At 410, method 400 uses provisioning server 108 to validate the IMSI. According to an aspect, validation operations include verifying that an IMSI length is 15/16 digits, verifying that MCC/MNC values are valid for MVNO or Partner MNO/MVNO networks, and/or verifying that the encryption did not fail or handle any other process errors. For example, provisioning server 108 can be configured with a validation mask to validate that the MCC, MNC, and MSIN are valid and do not include errors (e.g., letters). Once the IMSI is validated, method 400 at 412 uses provisioning server 108 to create a carrier configuration that includes the encrypted IMSI for user device 112. The validated IMSI and/or encrypted IMSI can be stored in subscriber database 107. In certain implementations, it may be preferable to perform validation operations before encryption operations. At 414, method 400 uses provisioning server 108 to provide the carrier configuration and encrypted IMSI to user device 112 for storing in secure storage (e.g., secure enclave, etc.).

Figure 5:
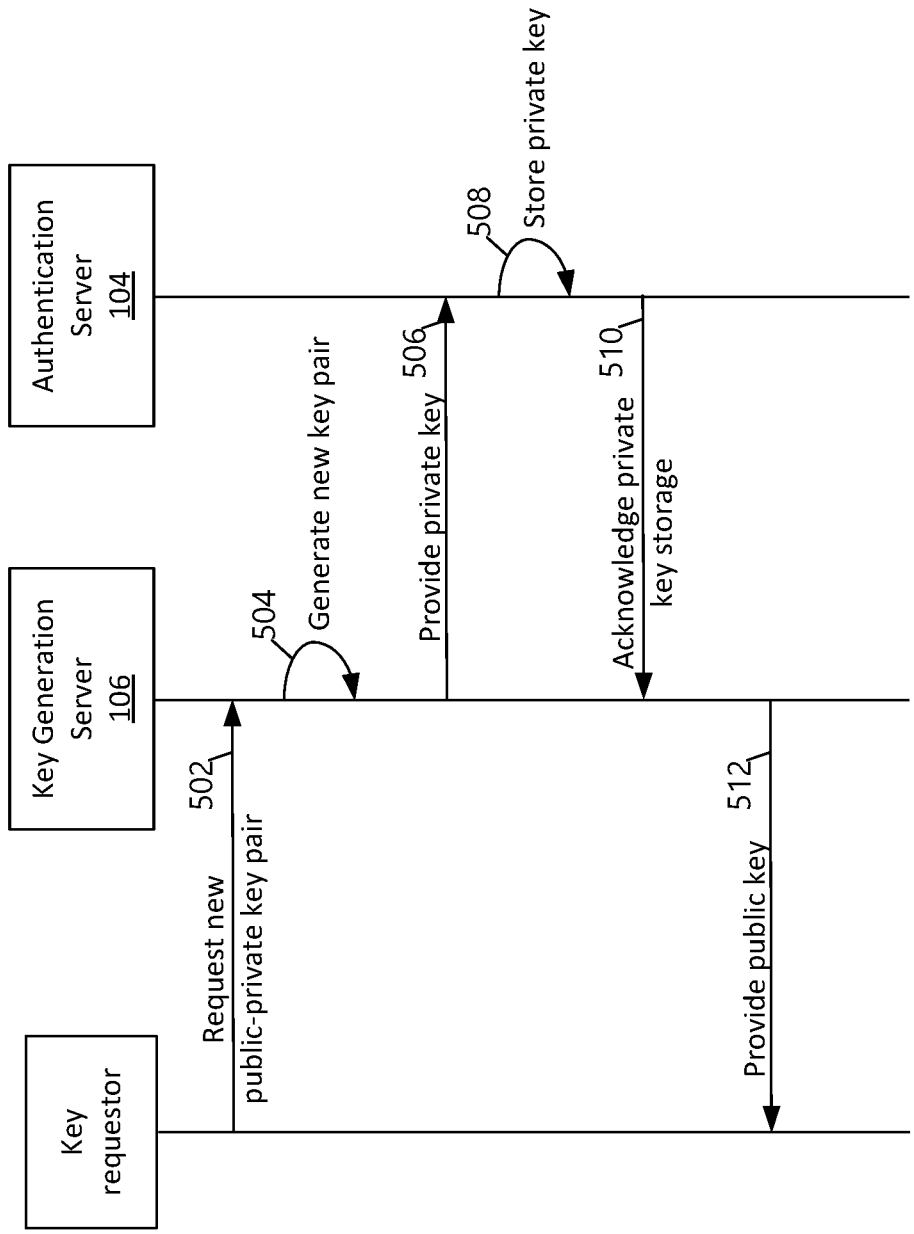
FIG. 5 is a high-level communication diagram of generating a public-private key pair, according to an aspect.

FIG. 5 is a high-level communication diagram of generating a public-private key pair according to an aspect. At 502, a request is sent to key generation server 106 from a key requestor requesting generation of a new public-private key pair. For example, an MVNO can utilize an automated key renewal process to generate a new public-private key pair or an MVNO administrator (e.g., upon theft of a currently implemented key) can request generation of a new public-private key pair. As described herein, the new public-private key pair can be used for provisioning new devices and authenticating devices requesting access to MVNO network 110. According to one aspect, the new public-private key pair can be used to encrypt and decrypt SIM-based identities of user devices when onboarding new subscribers and/or controlling access to MVNO network 110.

At 504, key generation server 106 generates a new public-private key pair. At 506, key generation server 106 provides the private key of the new public-private key pair to authentication server 104. At 508, authentication server 104 encrypts and stores the private key in escrow storage. At 510, authentication server 104 sends a message to key generation server 106 acknowledging that the private key has been stored. At 512, key generation server 106 provides the public key of the new public-private key pair to the key requestor with a message to publish the public key and replace any previous public key.

Figure 6:
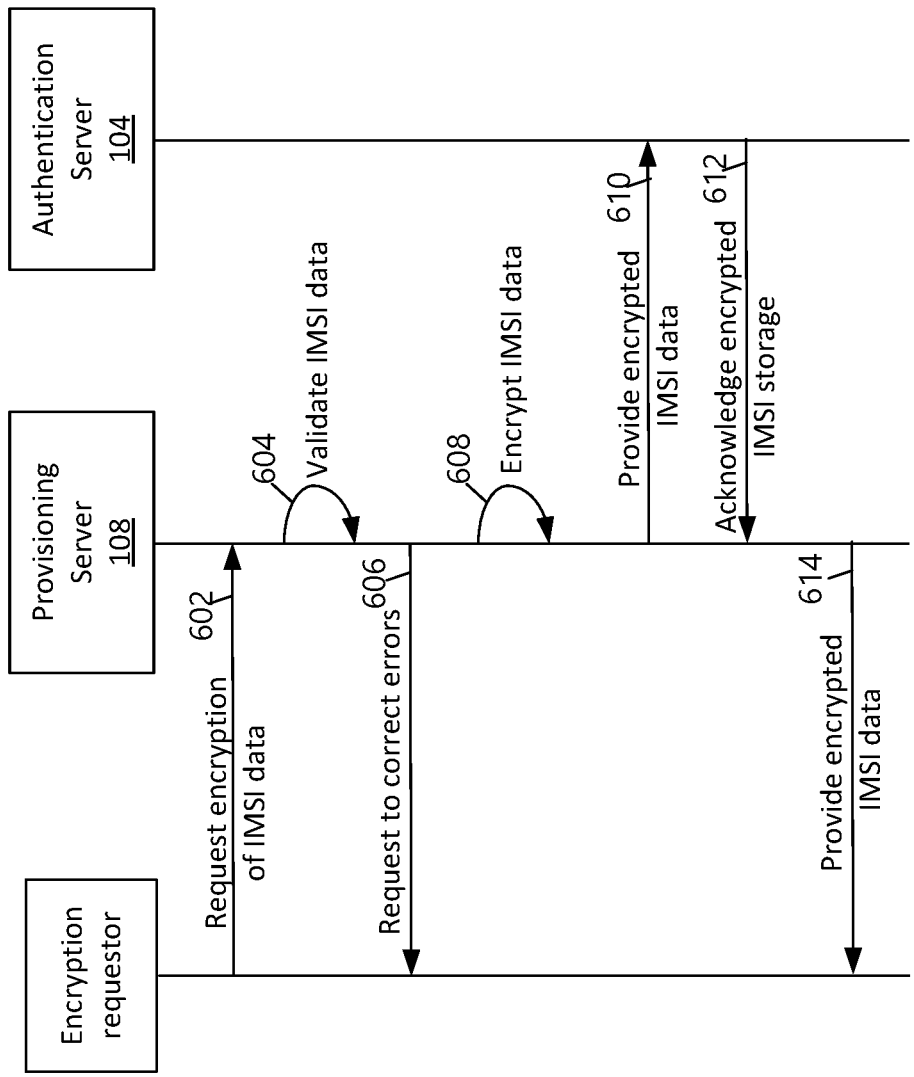
FIG. 6 is a high-level communication diagram of provisioning a new user device including public key encryption of IMSI data to control access and use of an MVNO network, according to an aspect.

FIG. 6 is a high-level communication diagram of provisioning a new user device including public key encryption of IMSI data to control access and use of MVNO network 110, according to an aspect. At 602, an encryption requestor sends IMSI data with a message to provisioning server 108 to encrypt the IMSI data. For example, an automated process can be used to generate an encryption requestor request when a user first subscribes to MVNO network 110 (e.g., by scanning a QR code) intending to use user device 112. At 604, provisioning server 108 validates IMSI data from a SIM card or an eSIM by checking whether the IMSI data has errors or other issues. If the IMSI data contains one or more errors, at 606, provisioning server 108 sends a message to the encryption requestor with any identified errors for correcting.

The encryption requestor can submit a new request once any errors are corrected. If the IMSI data does not contain any errors, at 608, provisioning server 108 uses the public key of the public-private key pair to encrypt the validated IMSI data. At 610, provisioning server 108 provides the encrypted IMSI data to authentication server 104 for storing for future authentication operations. At 612, authentication server 104 sends a message to provisioning server 108 that acknowledges storage of the encrypted IMSI data. At 614, provisioning server 108 provides the encrypted IMSI to the encryption requestor with a message to publish the encrypted IMSI data and invalidate any previously published encrypted IMSI data.

Figure 7:
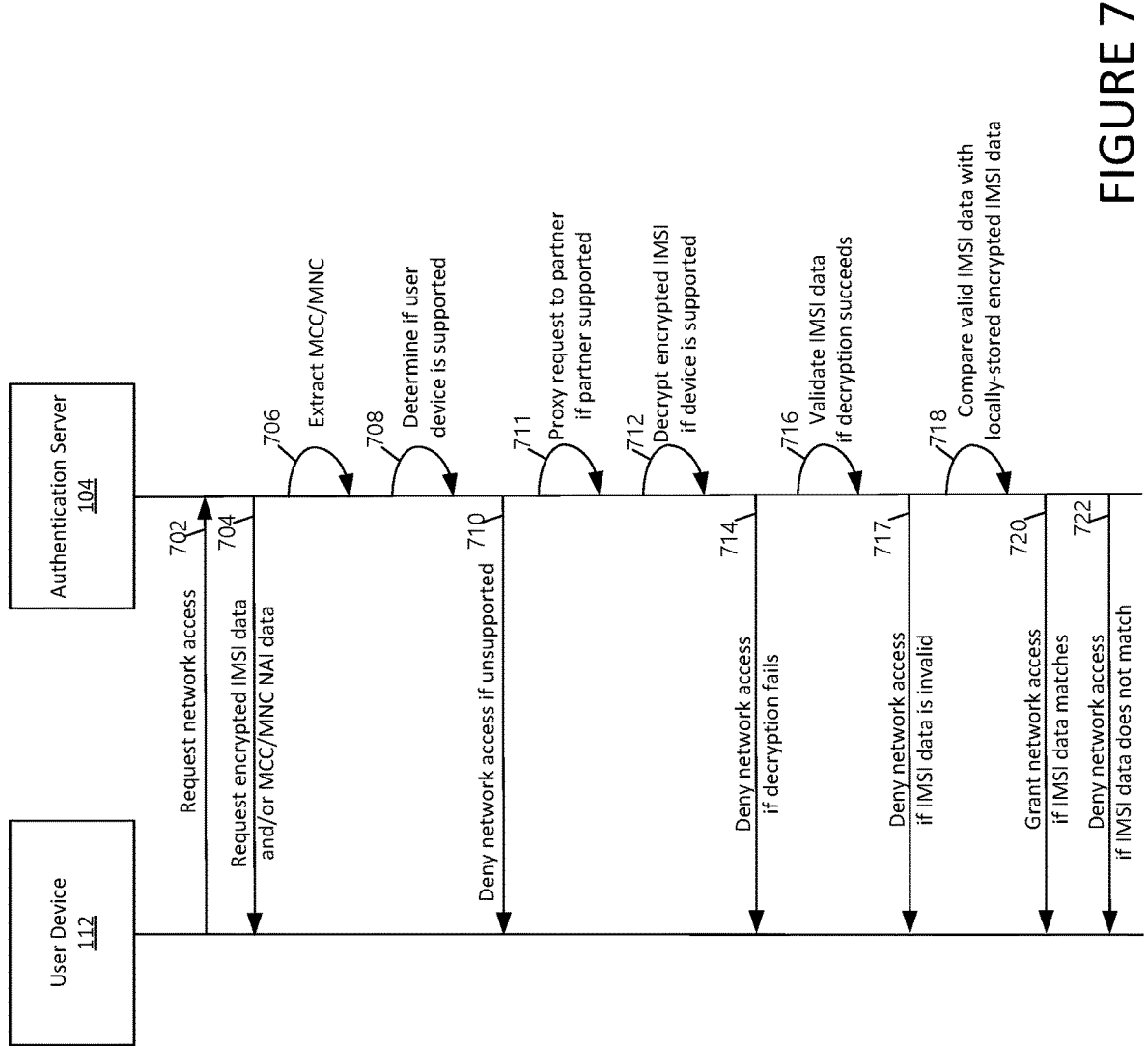
FIG. 7 is a high-level communication diagram of an authentication server performing authentication operations with a user device before allowing access to an MVNO network, according to an aspect.

FIG. 7 is a high-level communication diagram of authentication server 104 performing authentication operations with user device 112 to control access to MVNO network 110, according to an aspect. At 702, authentication server 104 receives a request from user device 112 for access to MVNO network 110. For example, a user may be using user device 112 as a WIFI client and the WIFI signal is fading as the user moves away from a WIFI gateway such that user device 112 automatically sends a request to access MVNO network 110 using an integrated cellular radio interface. At 704, authentication server 104 sends a message to user device 112 requesting that user device 112 send encrypted IMSI data and/or unencrypted MCC/MNC network access identifier (NAI) data. Alternatively, user device 112 can be configured to provide the unencrypted MCC/MNC NAI data with the access request at 702.

At 706, authentication server 104 extracts the MCC/MNC values from the unencrypted MCC/MNC NAI data. At 708, authentication server 104 determines whether user device 112 is supported on MVNO network 110 based on the MCC/MNC values. If the user device 112 is not supported on MVNO network 110, authentication server 104 sends a message to user device 112 denying access to MVNO network 110 at 710. If the user device 112 is supported by a partner of MVNO network 110, authentication server 104 sends a proxy message to the partner network at 711. If the user device 112 is supported on MVNO network 110 based on the MCC/MNC values, authentication server 104 decrypts the encrypted IMSI data at 712 with a private key. If the decryption fails for any reason, authentication server 104 sends a message to user device 112 denying access to MVNO network 110 at 714.

If the decryption of the encrypted IMSI data is successful, authentication server 104 validates the IMSI data at 716 by checking whether the IMSI data is free of errors. If the IMSI data has errors, at 717, authentication server 104 sends a message to user device 112 denying access to MVNO network 110. If the IMSI data is free of errors, at 718, authentication server 104 compares the error-free IMSI data with encrypted IMSI data that was stored in local storage (e.g., subscriber database 107) as a result of the provisioning process. According to an aspect, the comparison can be done by either matching the encrypted IMSI to a previously-stored encrypted IMSI or matching the unencrypted IMSI to a previously-stored unencrypted IMSI. The subscriber database 107 can be configured to store both encrypted and unencrypted versions. Security requirements drive whether one or both are stored in persistent storage or not. To avoid issues when ransomware attacks happen, the encrypted version is only stored and decrypted on-the-fly as needed. Some ransomware attacks are configured to scavenge memory buffers of computers for such data which may limit storing decrypted IMSIs on authentication server 104. If the previously-stored IMSI data matches the error-free IMSI data, at 720, authentication server 104 sends a message to user device 112 granting access to MVNO network 110. If the previously stored IMSI data does not match the error-free IMSI data, at 722, authentication server 104 sends a message to user device 112 denying access to MVNO network 110.

Figure 8:
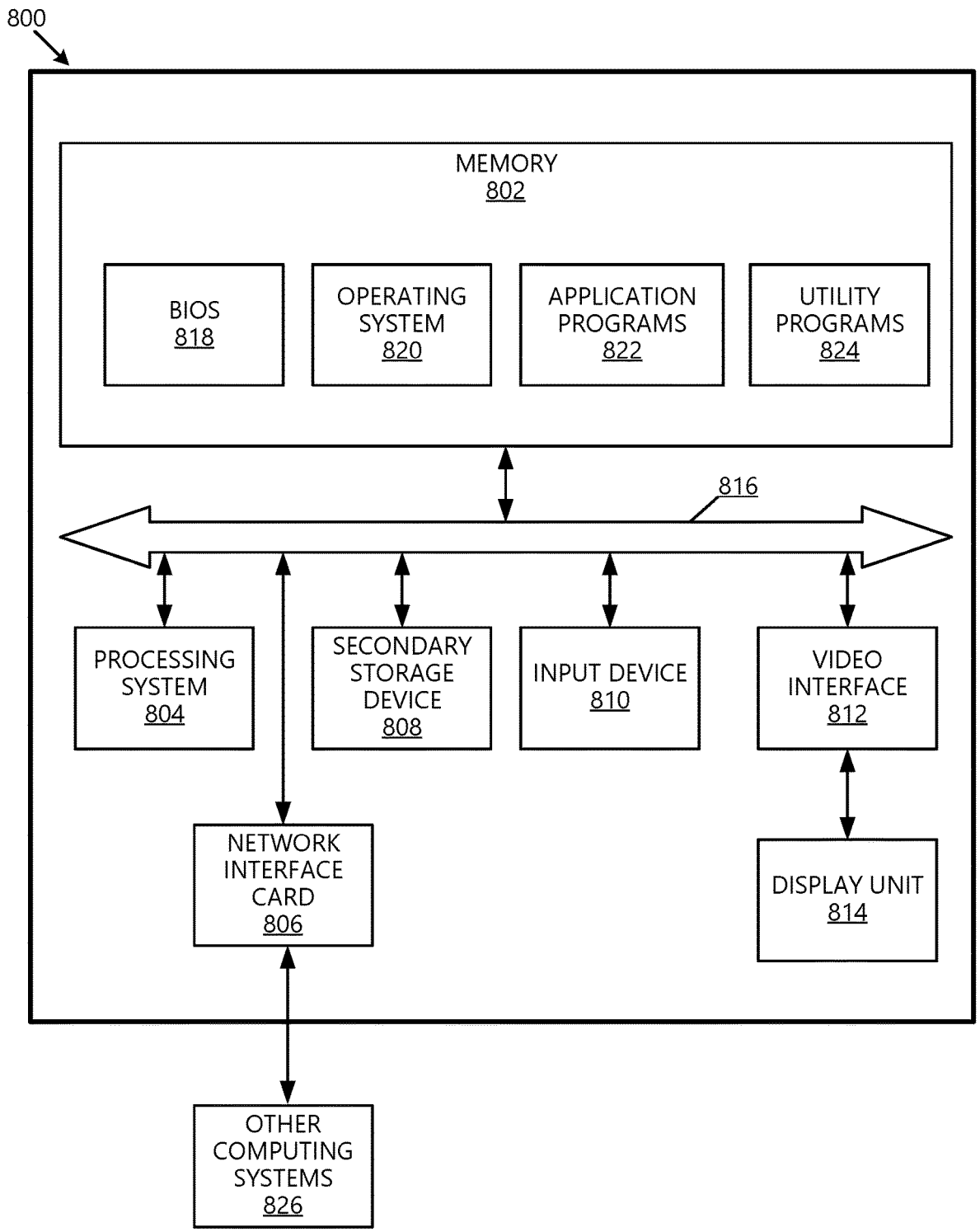
FIG. 8 is a block diagram illustrating example physical components of a computing device with which aspects may be practiced.

FIG. 8 is a block diagram illustrating example physical components of a computing device 800 or system with which embodiments may be practiced. Computing device 800 can be representative of a server machine, such as one or more of authentication server 104, key generation server 106, or provisioning server 108. It should be appreciated that in other embodiments, different hardware components other than those illustrated in the example of FIG. 8 may be used.

Computing devices may be implemented in different ways in different embodiments. For instance, in the example of FIG. 8, the computing device 800 includes a processing system 804, memory 802, a network interface card 806 (e.g., wired and/or wireless, cellular type, 802.11 type, etc.), a secondary storage device 808, an input device 810, a video interface 812, a display unit 814, and a communications medium 818. In other embodiments, the computing device 800 may be implemented using more or fewer hardware components (e.g., a video interface, a display unit, or an input device) or in combination with other types of computer systems and applications 826.

The memory 802 includes one or more computer-readable storage media capable of storing data and/or computer-executable instructions. Memory 802 may store computer-executable instructions that, when executed by a processor of the processing system 804, authenticate user devices requesting access to an MVNO network. In various embodiments, the memory 802 is implemented in various ways. For example, the memory 802 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 804 includes one or more processing units, which may include tangible integrated circuits that selectively execute computer-executable instructions. In various embodiments, the processing units in the processing system 804 are implemented in various ways. For example, the processing units in the processing system 804 can be implemented as one or more processing cores. In this example, the processing system 804 can comprise one or more microprocessors. In another example, the processing system 804 can comprise one or more separate microprocessors. In yet another example embodiment, the processing system 804 can comprise Application-Specific Integrated Circuits (ASICs) that provide specific functionality. In yet another example, the processing system 804 provides specific functionality by using an ASIC and by executing computer-executable instructions.

The computing device 800 may be enabled to send data to and receive data from a communication network via at least one network interface card 806 or circuit. In different embodiments, the network interface card 806 is implemented in different ways, such as an Ethernet interface, a token-ring network interface, a fiber optic network interface, a wireless network interface (e.g., cellular, BLUETOOTH, WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 808 includes one or more computer-readable storage media, and may store data and computer-executable instructions not directly accessible by the processing system 804. That is, the processing system 804 performs an I/O operation to retrieve data and/or computer-executable instructions from the secondary storage device 808. In various embodiments, the secondary storage device 808 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 810 enables the computing device 800 to receive input from a user. Example types of input devices include, but are not limited to, keyboards, mice, trackballs, stylus input devices, key pads, microphones, joysticks, touch-sensitive display screens, and other types of devices that provide user input to the computing device 800.

The video interface 812 outputs video information to the display unit 814. In different embodiments, the video interface 812 is implemented in different ways. For example, the video interface 812 is a video expansion card. In another example, the video interface 812 is integrated into a motherboard of the computing device 800. In various embodiments, the display unit 814 can be an LCD display panel, a touch-sensitive display panel, an LED screen, a projector, a cathode-ray tube display, or another type of display unit. In various embodiments, the video interface 812 communicates with the display unit 814 in various ways. For example, the video interface 812 can communicate with the display unit 814 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 816 facilitates communication among the hardware components of the computing device 800. In different embodiments, the communications medium 816 facilitates communication among different components of the computing device 800. For instance, in the example of FIG. 8, the communications medium 816 facilitates communication among the memory 802, the processing system 804, the network interface card 806, the secondary storage device 808, the input device 810, and the video interface 812. In different embodiments, the communications medium 816 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, Serial Peripheral interface (SPI), IIC interface, Universal Asynchronous Receiver/Transmitter (UART) interface, or another type of communications medium.

The memory 802 stores various types of data and/or software instructions. For instance, in the example of FIG. 8, the memory 802 stores a Basic Input/Output System (BIOS) 818 and an operating system 820. The BIOS 818 includes a set of software instructions that, when executed by the processing system 804, cause the computing device 800 to boot up. The operating system 820 includes a set of software instructions that, when executed by the processing system 804, cause the computing device 800 to provide an operating system that coordinates the activities and sharing of resources of the computing device 800. The memory 802 also stores one or more application programs 822 or program code that, when executed by the processing system 804, cause the computing device 800 to provide applications to users. The memory 802 also stores one or more utility programs 824 that, when executed by the processing system 804, cause the computing device 800 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), WAN technologies (T1, Frame Relay), Point-to-Point Protocol over Ethernet (PPOE), etc. including any combination thereof.

FIGS. 9A-9B illustrate a suitable mobile computing device 900 or environment, for example, a mobile computing device or smartphone, a tablet personal computer, a laptop computer, or other end device, with which aspects can be practiced. The mobile computing device 900 is illustrative of any suitable device operative to send, receive and process wireless communications, as well as run applications. A display screen 905 is operative for displaying a variety of information such as information about incoming and outgoing communications, as well as, a variety of data and displayable objects, for example, text, alphanumeric data, photographs, and the like.

Data input to the mobile computing device 900 can be performed via a variety of suitable means, such as, touch screen input via the display screen 905, keyboard or keypad input via a data entry area 910, key input via one or more selectable buttons or controls 915, voice input via a microphone 918 disposed on the mobile computing device 900, photographic input via a camera 925 functionality associated with the mobile computing device 900, or any other suitable input means. Data can be output via the mobile computing device 900 via any suitable output means, including but not limited to, display on the display screen 905, audible output via an associated speaker 930 or connected earphone system, vibration module for providing tactile output, and the like.

Referring now to FIG. 9B, operational unit 935 is illustrative of internal operating functionality of the mobile computing device 900. A processor 940 is illustrative of a computer processor for processing incoming and outgoing data and communications and controlling operation of the device and associated software applications via a mobile computing device operating system. Memory 945 can be utilized for storing a device operating system, device programming, one or more stored applications, for example, mobile telephone applications, data processing applications, calculators, games, Internet browsing applications, navigation applications, acceleration applications, camera and/or video applications, client applications etc.

Mobile computing device 900 can contain an accelerometer 955 for detecting acceleration, and can be used to sense orientation, vibration, and/or shock. Mobile computing device 900 can contain a global positioning system (GPS) system (e.g., GPS send/receive functionality) 960. A GPS system 960 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 950 include all required functionality, including onboard antennae, for allowing the mobile computing device 900 to communicate with other communication devices and systems via one or more wireless networks (e.g., cellular, Wi-Fi, Bluetooth, etc.). Radio functions 950 can be utilized to communicate with a wireless or WI-FI-based positioning system to determine a device location.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of controlling access to a mobile virtual network operator (MVNO) network comprising:
   receiving, at a server machine of the MVNO network, a network access request from a user device to access the MVNO network;
   determining, by the server machine of the MVNO network, if the user device is associated with the MVNO network;
   in response to determining that the user device is associated with the MVNO network, requesting, by the server machine of the MVNO network, an encrypted subscriber identity module (SIM)-based identity from the user device, wherein the SIM-based identity is associated with at least one SIM of the user device;
   performing, by the server machine of the MVNO network, a decryption operation on the encrypted SIM-based identity with a private key;
   providing, by the server machine of the MVNO network, International Mobile Subscriber Identity (IMSI) data when the decryption operation is successful;
   validating, by the server machine of the MVNO network, the IMSI data, without access to a mobile network operator (MNO);
   verifying, by the server machine of the MVNO network, that the user device is authorized to access the MVNO network based on the validated IMSI data and subscriber data; and one of:
      enabling access, by the server machine of the MVNO network, to the MVNO network when the IMSI data is valid and the user device is authorized to access the MVNO network; or
      denying access, by the server machine of the MVNO network, to the MVNO network based on at least one of:
         an unsuccessful decryption operation, invalid IMSI data, or when the user device is not authorized to access the MVNO network.

2. The method of claim 1, wherein the server machine of the MVNO network receives the network access request from a cellular access point.

3. The method of claim 1, further comprising generating, by a key server of the MVNO network, a public-private key pair that includes the private key and a public key prior to receiving the network access request from the user device.

4. The method of claim 1, further comprising, prior to receiving the network access request from the user device:
   associating, by the server machine of the MVNO network, the SIM-based identity with the user device;
   encrypting, by the server machine of the MVNO network, the SIM-based identity; and
   transmitting, by the server machine of the MVNO network, the encrypted SIM-based identity as a carrier configuration to store in secure storage of the user device.

5. The method of claim 4, wherein the at least one SIM comprises a SIM card or an embedded SIM (eSIM) module and the carrier configuration includes a Mobile Country Code (MCC), Mobile Network Code (MNC), and the encrypted IMSI.

6. The method of claim 5, further comprising, by the server machine of the MVNO network, extracting an outer identity comprising the MCC and the MNC from the access request prior to requesting the encrypted SIM-based identity from the user device.

7. The method of claim 6, further comprising:
   based on the outer identity, determining by the server machine of the MVNO network, if the user device is associated with a partner network prior to requesting the encrypted SIM-based identity from the user device; and
   proxying the network access request to the partner network if the user device is associated with the partner network.

8. The method of claim 1, further comprising enabling access to the MVNO network by bypassing a Home Subscriber Server (HSS) or without using Mobile Device Management (MDM).

9. A system for controlling access to a mobile virtual network operator (MVNO) network comprising:
   an MVNO network hardware key server configured to generate a public-private key pair that includes a public key and a private key for the MVNO network;
   a MVNO subscriber database configured to store subscriber data; and
   an MVNO network authentication server configured to:
      receive, at a server machine of the MVNO network, a network access request from a user device to access the MVNO network;
      determine if the user device is associated with the MVNO network;
      in response to a determination that the user device is associated with the MVNO network, request an encrypted subscriber identity module (SIM)-based identity from the user device, wherein the SIM-based identity is associated with at least one SIM of the user device;
      perform a decryption operation on the encrypted SIM-based identity with the private key;
      provide International Mobile Subscriber Identity (IMSI) data when the decryption operation is successful;
      validate the IMSI data, without access to a mobile network operator (MNO);
      verify that the user device is authorized to access the MVNO network based on the validated IMSI data and the subscriber data; and one of:
         enable access to the MVNO network based on the validated IMSI data and when the user device is authorized to access the MVNO network; or
         deny access to the MVNO network based on at least one of:
            an unsuccessful decryption operation, invalid IMSI data, or when the user device is not authorized to access the MVNO network.

10. The system of claim 9, wherein the MVNO network authentication server receives the network access request from a cellular access point.

11. The system of claim 9, wherein a first server machine includes the MVNO network hardware key server and a second server machine includes the MVNO network authentication server and the MVNO subscriber database.

12. The system of claim 9, further comprising an MNVO provisioning server configured to:
    associate the SIM-based identity with the user device;
    encrypt the SIM-based identity with the public key; and
    transmit the encrypted SIM-based identity as a carrier configuration to store in secure storage of the user device.

13. The system of claim 9, wherein the MVNO network authentication server is further configured to extract an outer identity comprising a Mobile Country Code (MCC) and a Mobile Network Code (MNC) from the access request prior to the request for the encrypted SIM-based identity from the user device.

14. The system of claim 13, wherein the MVNO network authentication server is further configured to:
   based on the outer identity, determine when the user device is associated with a partner network prior to the request for the encrypted SIM-based identity from the user device; and
   proxy the network access request to the partner network if the user device is associated with the partner network.

15. The system of claim 9, configured to bypass a Home Subscriber Server (HSS) or not require Mobile Device Management (MDM).

16. A server machine for controlling access to a mobile virtual network operator (MVNO) network comprising:
   at least one processor; and
   memory that stores instructions which, when executed by the at least one processor are configured to:
      receive a network access request from a user device to access the MVNO network;
      determine if the user device is associated with the MVNO network;
      in response to a determination that the user device is associated with the MVNO network, request an encrypted subscriber identity module (SIM)-based identity from the user device, wherein the SIM-based identity is associated with at least one SIM of the user device;
      perform a decryption operation on the encrypted SIM-based identity with the private key;
      provide International Mobile Subscriber Identity (IMSI) data when the decryption operation is successful;
      validate the IMSI data, without access to a mobile network operator (MNO);
      verify that the user device is authorized to access the MVNO network based on the validated IMSI data and the subscriber data; and one of:
         enable access to the MVNO network based on the validated IMSI data and when the user device is authorized to access the MVNO network; or
         deny access to the MVNO network based on at least one of:
            an unsuccessful decryption operation, invalid IMSI data, or when the user device is not authorized to access the MVNO network.

17. The server machine of claim 16, wherein the instructions, when executed by the at least one processor, are further configured to:
   associate the SIM-based identity with the user device;
   encrypt the SIM-based identity with the public key; and
   transmit the encrypted SIM-based identity as a carrier configuration to store in secure storage of the user device.

18. The server machine of claim 16, wherein the instructions, when executed by the at least one processor, are further configured to extract an outer identity comprising a Mobile Country Code (LCC) and a Mobile Network Code (MNC) from the access request prior to the request for the encrypted SIM-based identity from the user device.

19. The server machine of claim 18, wherein the instructions, when executed by the at least one processor, are further configured to:
   based on the outer identity, determine when the user device is associated with a partner network prior to the request for the encrypted SIM-based identity from the user device; and
   proxy the network access request to the partner network if the user device is associated with the partner network.

20. The server machine of claim 16, wherein the instructions, when executed by the at least one processor, are further configured to enable access to the MVNO network by bypassing a Home Subscriber Server (HSS) or without using Mobile Device Management (MDM).

\* \* \* \* \*